J. T. CRANE.
PACKING.
APPLICATION FILED JAN. 20, 1919.

1,316,772.

Patented Sept. 23, 1919.

WITNESSES:
Arthur W. Carlson
Robert H. Weir

INVENTOR
John T. Crane
BY
Benjamin, Roadhouse & Lundy
ATTORNEYS

UNITED STATES PATENT OFFICE.

JOHN T. CRANE, OF MAYWOOD, ILLINOIS.

PACKING.

1,316,772. Specification of Letters Patent. Patented Sept. 23, 1919.

Application filed January 20, 1919. Serial No. 272,104.

*To all whom it may concern:*

Be it known that I, JOHN T. CRANE, a citizen of the United States, and a resident of Maywood, in the county of Cook and State of Illinois, have made certain new and useful Improvements in Packings, of which the following is a specification.

My present invention relates to improvements in packing, and has for its special objects the provision of a packing which may be easily fabricated and economically manufactured, and which, when manufactured, will be of such character as will permit of its being compressed into a suitable form to fill the packing chamber or stuffing box. As is known, both the forms and dimensions of packing chambers are divers and it is desirable to have a packing which will easily conform to the shape of the particular chamber or box, which is to be filled. Another object of my invention is the provision of a packing which may be impregnated or loaded with a maximum amount of graphite and oil, and other suitable lubricants. A still further object of my invention is the provision of a packing which may be made in continuous pieces of any desired lengths.

I prefer to attain the above objects by means of the structure illustrated in the accompanying drawing, in which—

Figure 1:
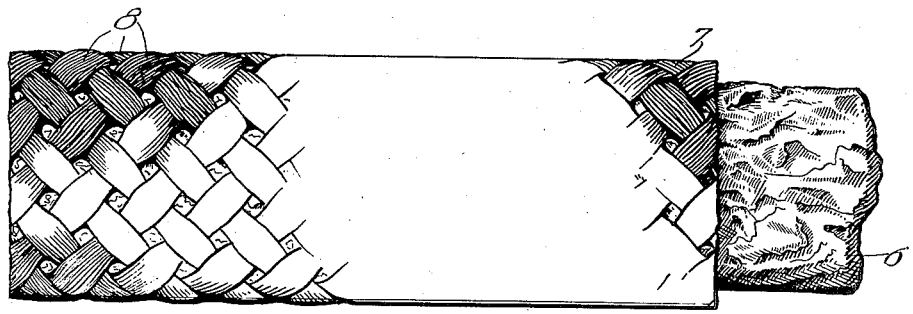
Figure 2:
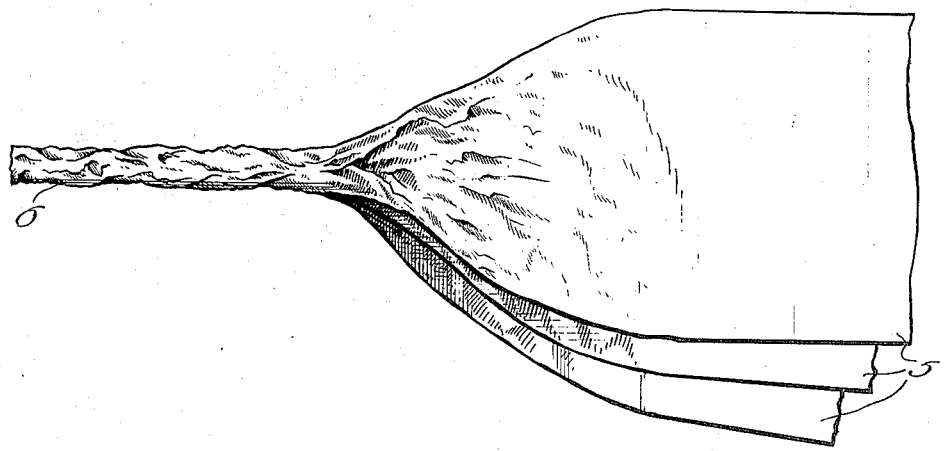

Figure 1 is a view of a piece of my completed packing drawn to an enlarged scale; and, Fig. 2 is a view of a fragment of the core thereof.

The core of my improved packing is made of a metal foil, preferably of Babbitt metal, lead, or tin. The foil is taken in ribbons of three or four inches in width and of a length sufficient to permit of the packing being made of continuous pieces of the desired length. As many ribbons of foil are employed as may be necessary to secure the desired cross-sectional dimensions of the packing which is to be made. These ribbons or sheets are crinkled transversely so as to wrinkle the foil, thereby providing a surface best adapted to retain and hold oil and plumbago or other suitable lubricating materials. A sufficient number of ribbons of the flat foil are passed through a bath of the desired lubricant and are then crinkled and compacted together to give them a suitable cross-sectional form, and about this core of crinkled and compacted foil is braided a casing, preferably of bundles of very fine gage hair-like copper wires.

Such a packing as above described will contain a maximum amount of lubricant and can be readily forced into a stuffing-box of any form. It is not necessary, however, that the braided casing should be of copper-wire or of metal at all, but I believe that a full metallic packing consisting of a crinkled foil core, with a braided copper-wire casing, is preferable where high pressures are employed.

The gist of my invention consists in the core formed of crinkled metal foil which is readily compacted into any desired shape and which will receive and hold a maximum quantity of lubricant. It is also evident that this packing may be made of continuous lengths of metal which obviates the necessity of using different pieces of metal in order to secure a packing of the desired length, and is also conducive to a greater uniformity in the packing and to greater strength for the materials used.

In the drawing the ribbons of foil are designated by the numeral 5 and are shown flat and smooth at their lower portions, while their upper portions have been crinkled together and formed into a substantially integral body to provide the core 6 of the packing. This core bearing the lubricant is fed into a braiding-machine where a suitable casing or covering 7 is braided upon its exterior and the strands which are utilized in this braiding operation consists of bundles 8 of very fine hair-like copper-wires. This drawing, however, is merely diagrammatic for the purpose of illustration for it will be obvious to persons skilled in this art that modifications may be made without materially departing from the principles of my invention. It is, therefore, understood that all such changes or refinements are contemplated within the scope of the appended claims.

What I claim is:—

1. A core for metallic packing comprising sheets of metal foil crinkled together and formed in suitable cross-sectional dimensions.

2. A packing consisting of a core comprising sheets of metal foil crinkled together and inclosed in a braided casing.

3. A packing consisting of a core comprising sheets of metal foil crinkled together and inclosed in a casing of braided copper-wire.

4. A core for packing comprising sheets of metal foil coated with lubricant and crinkled together.

5. A packing consisting of a core comprising sheets of metal foil coated with lubricant and crinkled together and inclosed in abraided casing.

6. A packing comprising sheets of lead foil coated upon both sides with graphite and oil and crinkled together and pressed into desired form, and a casing therfor formed of braided bundles of copper-wire.

Signed at Chicago, county of Cook and State of Illinois, this 16th day of January, 1919.

JOHN T. CRANE.

Witnesses:
E. K. LUNDY, Jr.,
H. SLACK.